United States Patent [19]

Stuemky et al.

[11] 3,855,817
[45] Dec. 24, 1974

[54] FLEXIBLE SHAFT
[75] Inventors: Robert E. Stuemky, Elizabeth; Gene H. George, Denver, both of Colo.
[73] Assignee: The Gates Rubber Company, Denver, Colo.
[22] Filed: June 18, 1973
[21] Appl. No.: 371,315

Related U.S. Application Data
[63] Continuation-in-part of Ser. No. 245,420, April 19, 1972, Pat. No. 3,779,038.

[52] U.S. Cl. ................. 64/2 R, 64/2 P, 64/11 B, 74/501
[51] Int. Cl. ............................................. F16d 1/02
[58] Field of Search ............... 64/2 R, 2 P, 1 V, 1 S, 64/3, 11 B, 15 R, 15 C; 74/501

[56] References Cited
UNITED STATES PATENTS

| 715,356 | 12/1902 | De Vito | 64/2 R |
| 1,471,488 | 10/1923 | Karge | 64/15 L |
| 1,798,009 | 3/1931 | Arens | 64/2 R |
| 1,897,542 | 2/1933 | West | 64/2 R |
| 2,166,376 | 7/1939 | Saurer | 64/11 R |
| 3,769,813 | 11/1973 | Okada | 64/2 R |

FOREIGN PATENTS OR APPLICATIONS

| 51,167 | 0/1966 | Germany | 64/2 |
| 846,041 | 0/1952 | Germany | 64/2 |

*Primary Examiner*—Samuel Scott
*Assistant Examiner*—Randall Heald
*Attorney, Agent, or Firm*—H. W. Oberg, Jr.; Raymond Fink; Curtis H. Castleman, Jr.

[57] ABSTRACT

A flexible shaft that includes two end caps, a tubularly shaped flexible element disposed between and connected to the end caps, and a rigid cylindrical section capable of supporting a portion of the flexible element between the end caps.

17 Claims, 4 Drawing Figures

FLEXIBLE SHAFT

This is a continuation-in-part of application Ser. No. 245,420, filed Apr. 19, 1972, now U.S. Pat. No. 3,779,038.

BACKGROUND OF THE INVENTION

The invention relates to flexible rotary shafting, but more particularly, the invention relates to shafting capable of transmitting torque at constant velocity between two rotating elements which may be parallely and angularly misaligned, and where the center distance between the rotating elements is constantly changing.

To accommodate angular and parallel misalignment and changes in center distance, prior art typically employs a piece of rigid shafting, a flexible coupling at each end of the rigid shafting, and a length change means such as a slip spline. A typical application where such shafting is prevalent, is the half shaft of an independent suspension of an automobile.

It is desirable to use constant velocity joints for the half shafts for maximum drive train smoothness. Often, an additional torsionally soft element is used in combination with the half shafts to further maximize drive train smoothness. Constant velocity joints and torsionally soft couplings are an economic drawback to an independent front or rear suspensions.

A significant problem associated with half shafts is the length change mechanism. Some constant velocity ball and raceway joints can accommodate length changes but the joints are quite expensive because of the mechanism involved. Also, some joints do not freely accommodate a length change as the mechanism tends to bind under large torque applications. A common spline when used as a length change device, sticks or locks under torque and thereby undesirably restricts movement of the suspension system. Ball splines are used at added expense to overcome the locking problem under torque application.

SUMMARY OF THE INVENTION

Flexible shafting is provided that includes two end cap portions, a flexible, torsional element of tubular shape attached to the end caps, and, a member supporting a portion of the flexible element.

Accordingly, an object of the invention is to provide flexible shafting that by itself can accommodate angular and parallel misalignment between changing center distances while transmitting torque at constant velocity.

Another object of the invention to to provide simple and economic shafting for suitable use as half shafts of an automotive type suspension system.

These and other objects or advantages of the invention will become more apparent in view of the drawings and description thereof wherein.

DESCRIPTION OF PREFERRED EMBODIMENTS

Figure 1:
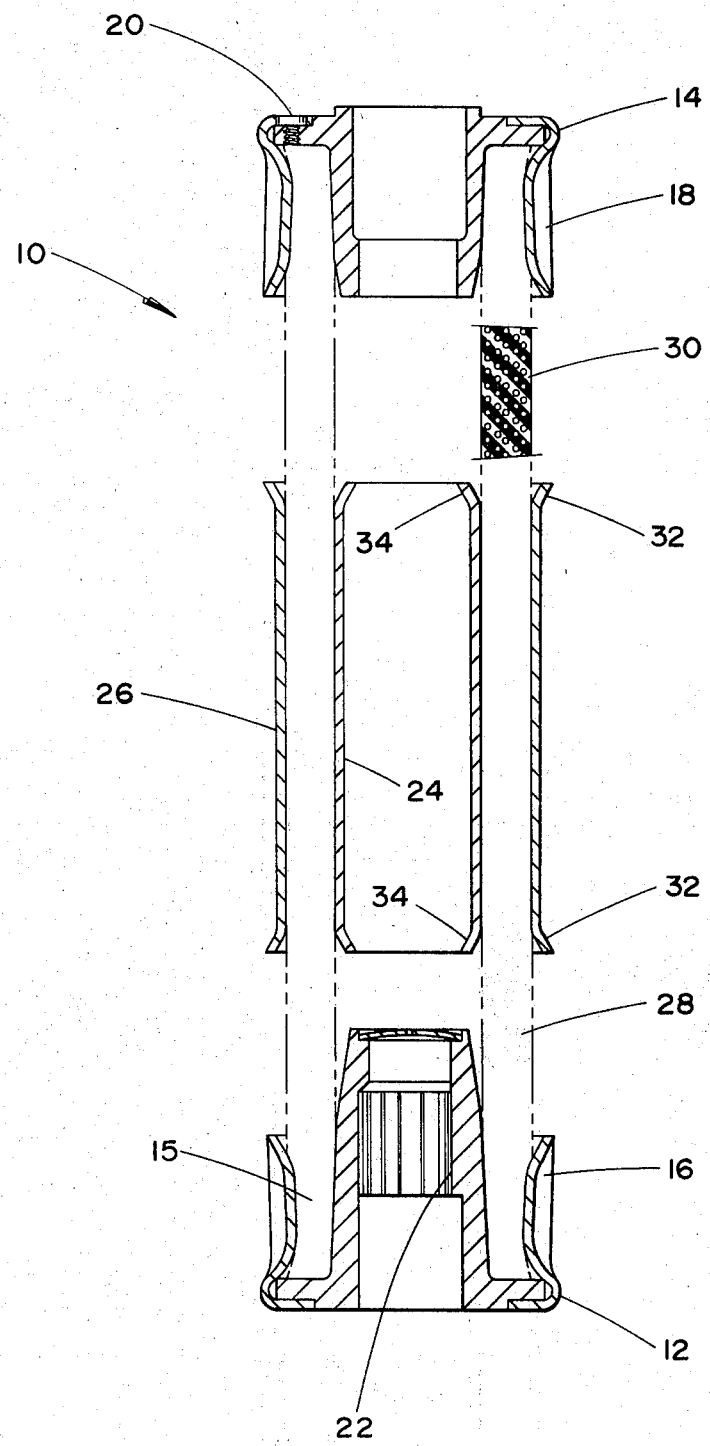
FIG. 1 is an axial cross sectional view of flexible shafting of the invention.

Referring to FIG. 1, flexible shafting 10 is provided in accordance with the invention that includes two end caps 12, 14 with a flexible element 15 disposed therebetween. One portion of the end cap 16, 18 grips or mounts the flexible element 15 while another portion of the end cap is adapted to connect with rotatable elements. For example, one end cap 14 may have a bolt circle 20 for adapting to a flanged shaft while the other end cap may have an internal spline 22 for receiving a splined shaft. Although not required, it is preferred that at least one end cap be adapted to receive a splined shaft for reasons which will later be explained.

While various types of flexible tubularly shaped elements and end caps may be used, the types as disclosed in U.S. Pat. No. 3,628,352 has proven most satisfactory. Such a flexible element is capable of longitudinally extending and compressing while under torsional loads, also, the end caps as disclosed therein offer an effective means for gripping the flexible element.

Inner 24 and outer 26 sleeves sandwich and reinforce a portion of the flexible element 15 leaving at least two unsupported sections to define active elements 28, 30. The sleeves 24, 26 may be easily held in place by radially expanding the inner sleeve 24, radially compressing the outer sleeve 26, or a combination of both. Alternatively, the sleeves may be bonded in place. The end portions of the outer sleeve 26 preferably are bent or flared radially outward 32 to avoid interference with the flexible element 15 while the inner sleeve 24 is preferably beveled, tapered or flared radially inward 34 for the same purpose. Combinations of more sleeves may be used to define additional active elements. However, two active elements have proven satisfactory for half shaft applications.

When the flexible shafting 10 is in use as for example as for half shafts in an automobile, one end cap 14 is attached with some type of fastener to a driven shaft such as the wheel shaft. The other end cap 12 is attached to a driver shaft such as an output shaft of a differential. Preferably, one of the end caps is attached by means of the spline 22. During rotation and under application of torque, the end cap 14 attached to the wheel shaft is free to move in varying degrees of misalignment in relation to the differential output shaft. For example, over a 15.5 inch length, the driver and driven shafts may move up to 2 inches of parallel misalignment resulting in the active elements flexing approximately 12° in angular misalignment. The parallel misalignment may simultaneously cause a center distance change between the driver and driven shafts of approximately one-half inch. The sleeves 24, 26 support the flexible element 15 to preclude it from buckling from misalignment and torsional loading.

As is well known in the art, simple spline shafts characteristically lock under torsional load which inhibits axial movement of the spline. It is customary to overcome spline lock-up by employing a more expensive ball spline or an axially free ball and raceway constant velocity universal joint. Under torsional loading, the spline 22 of the end cap locks precluding accommodation of a change in center distance. As the spline locks, the flexible element is extended or compressed to accommodate changes in center distance under torsional loads. When torsional loading is reduced, the spline is free to slide to preclude the flexible element from operating continuously under tensional or compressive loading. The spline is preferably used to extend the operating life of the flexible element under such conditions while also facilitating easy installation of the flexible shaft. Furthermore, the spline may compensate for large manufacturing tolerances between the driver and driven shafts which is more than the longitudinal flexibility of the flexible shaft.

Figures 2, 3:
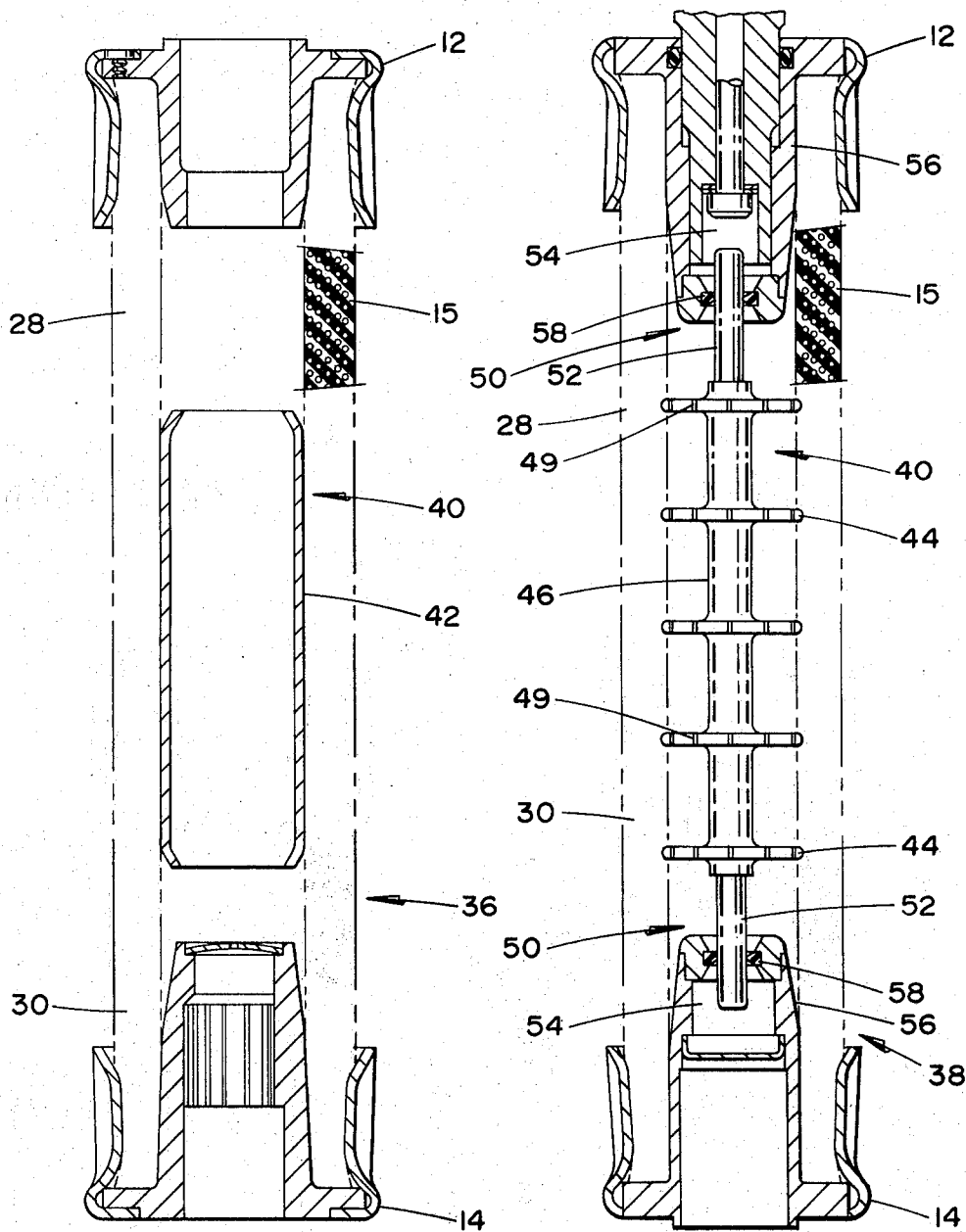
FIG. 2 is a view similar to FIG. 1 showing an alternate form of the invention.
FIG. 3 is a view similar to FIG. 1 showing an alternate form of the invention.

Referring to FIGS. 2 and 3 flexible shafts 36, 38 are provided that include the end caps 12, 14 and flexible element 15 in combination as previously explained. An inner support member 40 is disposed within the flexible element 15 to reinforce a center portion thereof leaving two unsupported sections near the ends that define active elements 28, 30. Any suitable member may be used to constitute the inner support. For example, the support member may be a sleeve 42 as illustrated in FIG. 2; a plurality of axially spaced discs 44 attached to or integral with a shaft 46 or hub as shown in FIG. 3; or the solid 48 of FIG. 4.

The external diameter of the support member 40 is generally equal to the internal diameter of the flexible element 15. More preferably, the external diameter of the support member is slightly larger than the free internal diameter of the support member in order that the flexible element receive firm support from the support member. Also, an interference fit between the support member and flexible element assures proper placement of the support member.

The support member 40 may be positioned within the flexible element by any other desirable means as long as support is rendered to the flexible element. For example, the support member may be bonded in place by means of an adhesive or during vulcanization of the flexible element, or the support member may be fabricated as an integral part of the flexible element. When a sleeve 42 is used to constitute the support member 40, it may be radially expanded into the flexible element.

Optionally, flutes 49 such as serrations, grooves, or the like may be formed at the external diameter of the support member such as shown in FIG. 3, to further enhance mechanical bonding with the flexible element.

While the flexible shafts as heretofor described are uncentered and suitable for use in many applications, the power transferring capabilities of the shaft is improved when positive kinematic centers of rotation are defined. The improved power transferring capability may be desirable to improve stall torque carrying capacity (buckling strength), runout and balance characteristics, or element life when repeated cycles of parallel and angular misalignment are encountered.

A centering device is located within the flexible element between each end cap and support member juxtaposed each unsupported section 28, 30 of the flexible element. For most applications, the center of rotation of each centering device is positioned generally near the mid point of each unsupported section as the mid point usually corresponds to the flexural center for the unsupported section. The actual center of rotation for the centering device may be located as desired to achieve any desired flexural effect.

Any suitable centering device 50, including those of the ball and socket type, may be used. However, the centering device of U.S. Pat. application, Ser. No. 245,419, now U.S. Pat. No. 3,779,038 and as shown in FIG. 3, is preferred as it compliments easy assembly with the center support member and end caps and allows for longitudinal length changes of the flexible element during operation. A pin 52 or extension of a shaft 46 extends coaxially from each end of the support member 40 and into a socket 54 of a hub 56 extending coaxially from each end cap 12, 14. An elastomeric ring 58 is retained in the sockets 54 and radially supports each pin 52. Together, the pin 52, ring 58 and socket 54 define a kinematic center of rotation for the unsupported sections. When a length change in the flexible element 15 occurs, the pins 52 may slide longitudinally in relation to the rings 58 while maintaining a kinematic center of rotation.

Figure 4:
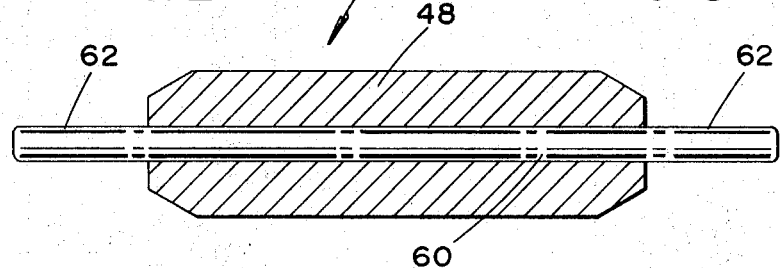
FIG. 4 is an axial cross sectional view showing an alternate form of a component part of the invention.

The pins may extend from or be attached to the support member as desired. FIG. 4 depicts a solid 48 support member 40 with a shaft 60 extending therethrough to define the pins 62. An optional manner for supporting pins in combination with axially spaced discs is shown in FIG. 3.

The foregoing detailed description is made for purpose of illustration only and is not intended to limit the scope of the invention which is to be determined from the appended claims.

What is claimed is:

1. A flexible shaft comprising:
   a generally tubularly shaped flexible element having two end portions;
   end caps affixed to the end portions; and
   inner and outer sleeves having lengths less than said flexible element, the sleeve disposed between the end portions and sandwiching a portion of the flexible element in a gripping and radially supporting manner to define at least two unsupported portions of said flexible element adjacent the sleeves.

2. A flexible shaft as set forth in claim 1 wherein the ends of the inner sleeve flare radially inward and the ends of the outer sleeve flare radially outward.

3. A half shaft for an automotive type vehicle comprising:
   a generally tubularly shaped flexible element having two end portions, and a central portion;
   end caps affixed to the end portions of the flexible element; and
   inner and outer sleeves having lengths less than said flexible element, the sleeves sandwiching and gripping the central portion of the flexible element in a radially supporting manner, the unsupported portions of the flexible element defining two active elements adjacent the sleeves, each capable of angular displacement while rotating.

4. A half shaft as set forth in claim 3 wherein the ends of the inner sleeve flare radially inward and the ends of the outer sleeve flare radially outward.

5. A half shaft as set forth in claim 3 wherein one end cap is adapted to receive a spline.

6. A shaft having a tubularly shaped flexible element with oppositely wound spiral spring elements disposed within a rubber matrix, and with end caps at each end of the flexible element, wherein the improvement comprises:
   inner and outer sleeves having lengths less than the flexible element, the sleeves sandwiching a portion of the flexible element between the end caps, said sleeves gripping and radially supporting a portion of the flexible element.

7. A shaft as set forth in claim 6 wherein the end portion of the inner sleeve flare radially inward and the portions of the outer sleeve flare radially outward.

8. A flexible shaft comprising:

a generally tubularly shaped flexible element having two end portions;

end caps attached to the end portions; and an inner support member having a length less than the flexible element, the support disposed within the flexible element between the end portions and radially supporting a portion of the flexible element to define two unsupported portions of flexible element between the end caps and inner support;

each unsupported portion having an axial length that is at least one-half the diameter of the flexible element.

9. A flexible shaft as set forth in claim 8 wherein a sleeve constitutes the inner support member.

10. A flexible shaft comprising:

a generally tubularly shaped flexible element of a plurality of oppositely wound spiral spring elements disposed within a rubber matrix;

an inner support member having a length less than the flexible element, the support disposed within the flexible element between the end portions and radially supporting a portion of the flexible element to define two unsupported portions of flexible element between the end caps and inner support the inner support member comprising, a plurality of coaxially spaced discs radially extending from an interconnecting shaft, the discs having an external diameter generally equal to the internal diameter of the tubular element, each disc radially supporting a portion of the tubular element; and two centering means disposed in the hollow of the flexible element juxtaposed each unsupported portion for defining a kinematic center of rotation for the unsupported portions, one portion of each centering means attached to a juxtaposed end cap and a second portion of each centering means attached to a juxtaposed end portion of the inner support.

11. A flexible shaft as set forth in claim 10 comprising:

a hub extending into a portion of the tubular element from each end cap, each hub having a socket portion facing and substantially concentric with the tubular element;

an elastomeric ring disposed within and extending radially inward from each socket portion of each end cap, one ring positioned near the mid point of each unsupported portion of the flexible element; and an end portion of the shaft extending into each socket, the shaft end portions extending through and radially supported by the elastomeric rings, the hubs, rings, and shaft end portions constituting the two centering means.

12. A flexible shaft as set forth in claim 10 wherein the discs are attached at their external diameters to the flexible element at its internal diameter by means of an adhesive.

13. A flexible shaft as set forth in claim 8 comprising:

a plurality of oppositely wound spiral spring elements disposed within a rubber matrix which constitutes the flexible element; and two centering means disposed in the hollow of the flexible element juxtaposed each unsupported portion for defining a kinematic center of rotation for the unsupported portions, one portion of each centering means attached to a juxtaposed end cap and a second portion of each centering means attached to a juxtaposed end portion of the inner support.

14. A flexible shaft as set forth in claim 8 wherein the support member has a plurality of flutes juxtaposed the flexible element.

15. A flexible shaft comprising a generally tubular flexible element having two end portions; end caps attached to the end portions for connection to two rotatable shafts; and supporting means disposed between the end portions of the element for radially supporting a portion of the element and of a length to define at least two unsupported portions of the flexible element between the end caps and supporting means, each unsupported portion having an axial length that is at least one-half the diameter of the flexible element.

16. A flexible shaft comprising:

a generally tubularly shaped flexible element having two end portions;

end caps attached to the end portions;

a hub extending into a portion of the tubular element from each end cap, each hub having a socket portion facing and substantially concentric with the tubular element;

an elastomeric ring disposed within and extending radially inward from each socket portion of each end cap, one ring positioned near the mid point of each unsupported portion of the flexible element;

an inner support member having a length less than the flexible element, and the support disposed within the flexible element between the end portions and radially supporting a portion of the flexible element to define two unsupported portions of the flexible element between the end caps and inner support; and shaft end portions extending from each end of the inner support member through and radially supported by the elastomeric rings, the hubs, rings, and shaft end portions defining two centering means.

17. A flexible shaft comprising:

a generally tubularly shaped flexible element having two end portions;

end caps attached to the end portions;

an inner support member having a length less than the flexible element, the inner support member disposed within the flexible element between the end portions and radially supporting an intermediate portion of the flexible element to define two radially unsupported portions of the flexible element axially between the end caps and inner support member; and two centering means for establishing kinematic centers of rotation for each radially unsupported portion of flexible element.

* * * * *

UNITED STATES PATENT OFFICE
CERTIFICATE OF CORRECTION

Patent No. 3,855,817          Dated January 13, 1975

Inventor(s) Robert E. Stuemky et al

It is certified that error appears in the above-identified patent and that said Letters Patent are hereby corrected as shown below:

Title page, paragraph [63], reading "Continuation-in-part of Ser. No. 245,420, April 19, 1972, Pat. No. 3,779,038, should read --Continuation-in-part of Ser. No. 245,420, April 19, 1972, now abandoned--.

Column 1, lines 2-4 reading "This is a continuation-in-part of application Ser. No. 245,420, filed Apr. 19, 1972, now U.S. Patent No. 3,779,038, should read --This is a continuation-in-part of Patent application Serial No. 245,420, filed April 19, 1972, now abandoned--.

Signed and sealed this 4th day of March 1975.

(SEAL)
Attest:

RUTH C. MASON
Attesting Officer

C. MARSHALL DANN
Commissioner of Patents
and Trademarks